United States Patent [19]
Inarida et al.

[11] Patent Number: 5,781,423
[45] Date of Patent: Jul. 14, 1998

[54] PULSE WIDTH MODULATION CONTROL SYSTEM FOR ELECTRIC POWER CONVERTER

[75] Inventors: Satoru Inarida, Hitachinaka; Kiyoshi Nakata, Iwase-machi; Kouji Yasuda, Hitachinaka; Masato Suzuki, Urizura-machi; Wataru Miyake, Hitachinaka, all of Japan

[73] Assignee: Hitachi, Ltd., Tokyo, Japan

[21] Appl. No.: 797,621

[22] Filed: Feb. 7, 1997

[30] Foreign Application Priority Data

Jan. 3, 1996 [JP] Japan ................... 8-044460

[51] Int. Cl.$^6$ ........................... H02M 1/12
[52] U.S. Cl. ................... 363/41; 363/95; 363/131
[58] Field of Search ............... 363/39, 40, 41, 363/95, 131, 132, 98, 37, 16, 17; 364/851; 318/811

[56] References Cited

U.S. PATENT DOCUMENTS

| | | | |
|---|---|---|---|
| 4,516,065 | 5/1985 | Ninomiya et al. | 318/811 |
| 4,628,475 | 12/1986 | Azusawa | 364/851 |
| 4,757,434 | 7/1988 | Kawabata et al. | 363/41 |
| 4,891,744 | 1/1990 | Yamamoto et al. | 363/89 |
| 4,941,079 | 7/1990 | Ooi | 363/132 |
| 5,377,092 | 12/1994 | Kowand, Jr. et al. | 363/41 |
| 5,467,262 | 11/1995 | Nakata et al. | 363/41 |
| 5,481,451 | 1/1996 | Kuwahara | 363/37 |
| 5,633,788 | 5/1997 | Tanaka et al. | 363/41 |
| 5,657,215 | 8/1997 | Faulk | 363/41 |

*Primary Examiner*—Adolf Berhane
*Attorney, Agent, or Firm*—Antonelli, Terry, Stout & Kraus, LLP

[57] ABSTRACT

In a pulse width modulation control method and system for an electric power converter, in order to suppress the occurrence of lower order harmonics and fractional order harmonics in a direct current component even in a condition where a carrier frequency is several times as small as the frequency of a command value, pulse width modulation pulses for driving semiconductor elements in the electric converter are calculated by comparing a command signal from a command value generating means with a carrier signal having a continuous triangular-wave and a constant period. For this purpose, there is provided a means for separately calculating a time product of a command value of the command signal from the command value generating means and a time product of the pulse width modulation pulses and for calculating a difference value representing a difference between both time products. The pulse width modulation pulse is then calculated using the calculated difference value to compensate the command signal received from the command value generating means.

7 Claims, 5 Drawing Sheets

PULSE WIDTH MODULATION CONTROL SYSTEM FOR ELECTRIC POWER CONVERTER

BACKGROUND OF THE INVENTION

The present invention relates to a system for performing pulse width modulation control of an electric power converter, such as a traction inverter, a power supply converter and the like; and more particularly, to a pulse width modulation control system for an electric converter which is capable of operating an inverter without generating a low frequency pulsation in the voltage and the current thereof, when a ratio of the switching frequency to the inverter operating frequency is low.

Conventional pulse width modulation control methods include a sub harmonic method in which pulse width modulation pulses for driving an inverter are generated by comparing a carrier signal having a continuous triangular-wave shape and a constant frequency with an inverter output command value. Further, pulse width modulation can be roughly classified into asynchronous pulse width modulation control and synchronous pulse width modulation control, as will be described below.

In asynchronous pulse width modulation control, when the frequency of a triangular-wave carrier (hereinafter referred to as the "carrier frequency") is high enough compared to the frequency of a command value, the carrier frequency is fixed to a constant value and only the frequency of the command value is varied. For example, this type of asynchronous pulse width modulation control is disclosed in U.S. Pat. No. 5,467,262.

In synchronous pulse width modulation control, when the carrier frequency is comparably near to the frequency of the command value, the carrier frequency is always set to an integer times the command value. In that case, the carrier frequency and a ratio of the carrier frequency to the frequency of the command value are varied according to the frequency of the command value.

In the case of asynchronous pulse width modulation control, it is required that the carrier frequency is sufficiently higher than the frequency of the command value, and the ratio of the carrier frequency to the frequency of the command value is generally required to be larger than about fifteen. When the ratio is smaller than this value, low order harmonics are increased and fractional order harmonics are generated. Therefore, current ripple becomes large, and, consequently, large capacity switching elements are required. In addition to this, when a motor is driven, there occurs pulsation in the torque.

Although such problems can be solved by setting the carrier frequency to a sufficiently high value, there occurs another problem in that the switching loss increases and, accordingly, the efficiency of the inverter is decreased. Further, for a large capacity inverter, there is a limitation on the available switching elements, and therefore the carrier frequency cannot physically be set to a high value.

On the other hand, in the case of synchronous pulse width modulation control, even when the carrier frequency is low, harmonics can be suppressed to a certain degree and the occurrence of fractional order harmonics can be prevented. However, the carrier frequency and the number of pulses are required to be switched depending on the frequency of the command value (determined by a ratio of the carrier frequency to the frequency of the command value), and so there arises a problem in that the control becomes complex and pulsation accompanied by switching of the number of pulses (switching shock) occurs.

In addition to this, when synchronous pulse width modulation control is employed for an electric vehicle or an elevator, the passengers get an uncomfortable feeling from sound due to magnetic noise.

SUMMARY OF THE INVENTION

An object of the present invention is to provide an asynchronous pulse width modulation control system for an inverter which can prevent an increase in the lower order harmonics and the occurrence of fractional order harmonics even when the ratio of the switching frequency to the operating frequency of the inverter is small.

The present invention is characterized by a pulse width modulation control system, in which the pulse width of modulation pulses for driving semiconductor elements in an electric converter are calculated by comparing a command signal received from a command value generating means with a carrier signal having a continuous triangular-wave shape and a constant period, which system comprises a means for separately calculating a time product of the command value of the command signal received from the command value generating means and a time product of the pulse width modulation pulses and for calculating a difference value representing the difference between both time products, the pulse width of the modulation pulse being calculated using the calculated difference value to compensate the command signal received from the command value generating means.

According to the present invention, since the sum of the output pulse widths is caused to agree with the sum of the command value by adding the difference between the time product of the command value and the time product of the pulse width modulation pulses to the command value, the occurrence of an unbalance between widths of positive and negative pulses can be prevented and the generation of lower order harmonics and fractional harmonics can be prevented.

DETAILED DESCRIPTION OF THE PREFERRED EMBODIMENTS

Figure 1:
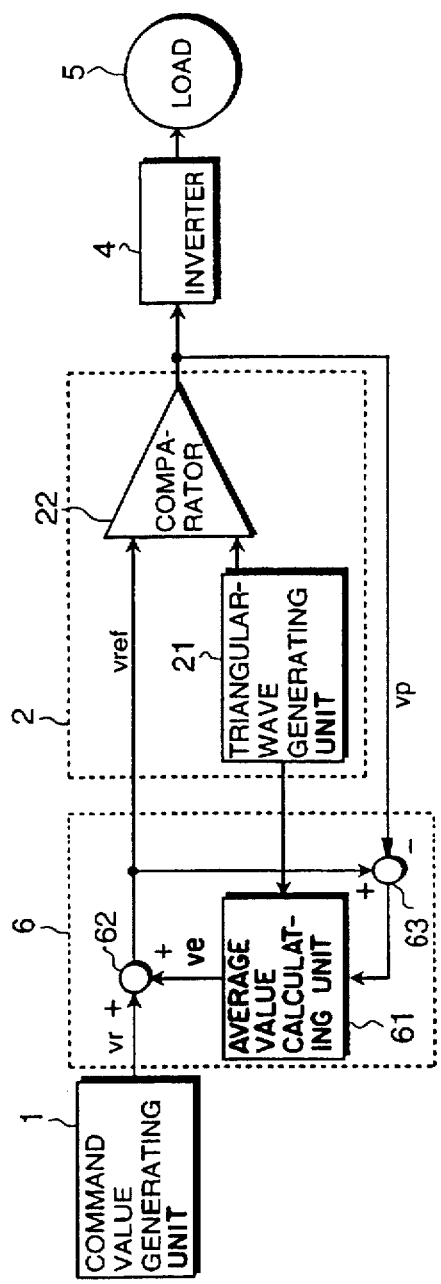
FIG. 1 is a block diagram showing the construction of an embodiment in accordance with the present invention.

An embodiment of the present invention will be described in detail below, referring to the inverter control system of FIG. 1. In a command value generating unit 1, an output voltage command value $v_r$, for an inverter 4 is generated. In a pulse compensation unit 6, a signal $v_{ref}$ is output based on the output $v_r$ of the command value generating unit 1. A pulse width modulation pulse generating unit 2 receives the output signal $v_{ref}$ of the pulse compensation unit 6, and generates a pulse width modulation pulse $v_p$ corresponding to the signal $v_{ref}$. Further, the inverter control system is connected to an inverter 4 which outputs alternating current from direct current by driving switching elements in the inverter based on the pulse width modulation signal $v_p$, and a load 5, such as a motor, is connected to the alternating current output of the inverter system.

The output signal $v_p$ of the pulse width modulation pulse generating unit 2 is fed back to the pulse compensation unit 6. The pulse width modulation pulse generating unit 2 is a well-known pulse width modulation pulse generating unit which generates a pulse width modulation pulse $v_p$ by comparing a carrier signal of continuous triangular-wave shape and having a constant period, which is output from a triangular-wave generating unit 21, with the signal $v_{ref}$ using a comparator 22.

The present invention is characterized by the pulse compensation unit 6 which is composed of a subtracter 63 for calculating a difference between the signal $v_{ref}$ input to the pulse width modulation pulse generating unit 2 and the output pulse width modulation signal $v_p$, an average value calculating unit 61 for calculating an average value $v_c$ of the output of the subtracter 63 every one-half period of a triangular wave output from the triangular-wave generating unit 21, and an adder 62 for adding the output $v_c$ of the average value calculating unit to the command value $v_r$ to obtain the signal $v_{ref}$.

The details of the pulse compensation method according to the present invention will be described below, with reference to FIG. 2 and FIG. 3. In order to make it easy to understand, the description will refer to the conventional triangular-wave comparing method as an example. An inverter command value $v_r$, and a triangular wave $v_t$ are shown in (a) in FIG. 2, an output $v_p$ of the pulse width modulation pulse generating unit is shown in (b) in FIG. 2, an average value (time product) of $v_p$ over a one-half period of the triangular wave is shown in (c) in FIG. 2, an average value $V_a$ (time product) of the command value $v_r$ over a one-half period of the triangular wave is shown in (d) in FIG. 2, and a difference $v_c$ between the average value of $v_r$ and the average value of $v_p$ is shown in (e) in FIG. 2. The symbol $\Delta t$ denotes a one-half period of the triangular wave, and $\Delta t = \frac{1}{2} f_c$, where $f_c$ is a frequency of the triangular wave.

Figure 2:
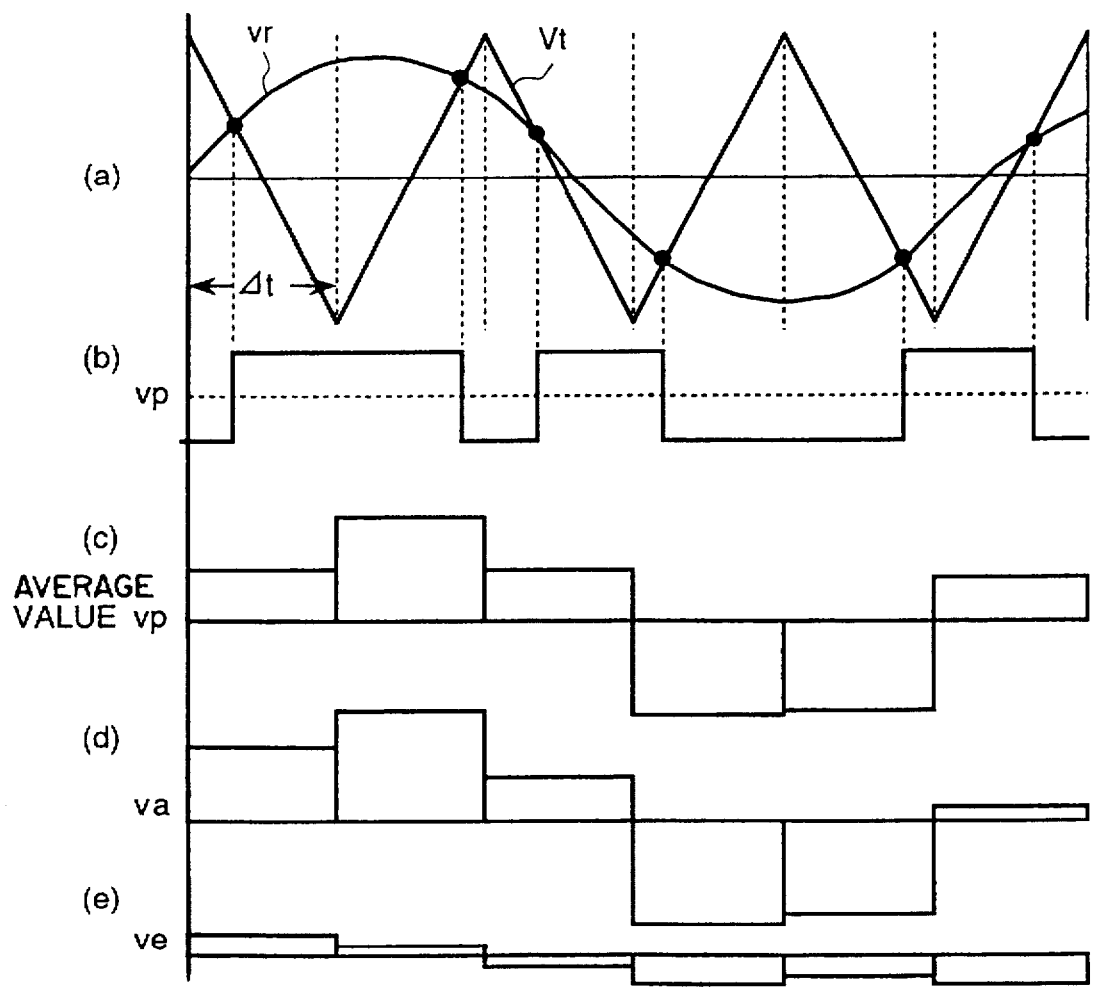
FIG. 2a–e is a waveform chart for explaining a cause of the problem to be solved by the present invention.

A description now will be provided on the principle of generating lower order harmonics and fractional order harmonics in asynchronous pulse width modulation and on the pulse compensation method for suppressing the lower order harmonics and the fractional order harmonics, with reference to FIG. 2.

If an average value $v_a$ of the modulated wave in the period $\Delta t$ is accurately reflected on an output pulse $v_p$ of the pulse width modulation signal, lower order harmonics and fractional order harmonics cannot be generated. However, as shown in FIG. 2, the average value of the modulated wave and the voltage $v_p$ reflected on the pulse width modulation pulse do not always agree. As a result, a difference $V_c$ between the average value of the modulated wave and the voltage reflected on the pulse width modulation pulse is generated, which causes lower order harmonics and fractional order harmonics and low frequency pulsation current flows.

In accordance with the present invention, in order to suppress the occurrence of lower order harmonics and fractional order harmonics, the pulse compensation unit 6 is introduced. In the pulse compensation unit 6, the difference between a voltage $v_p$ and a command value $V_{ref}$ is calculated, and a time average $v_c$ of the difference over a one-half period $\Delta t$ of the triangular wave is calculated by the average value calculating unit 61, and the result is added to a command value $v_r$.

Here, numeral 62 denotes an adder and numeral 63 denotes a subtracter.

Figure 3:
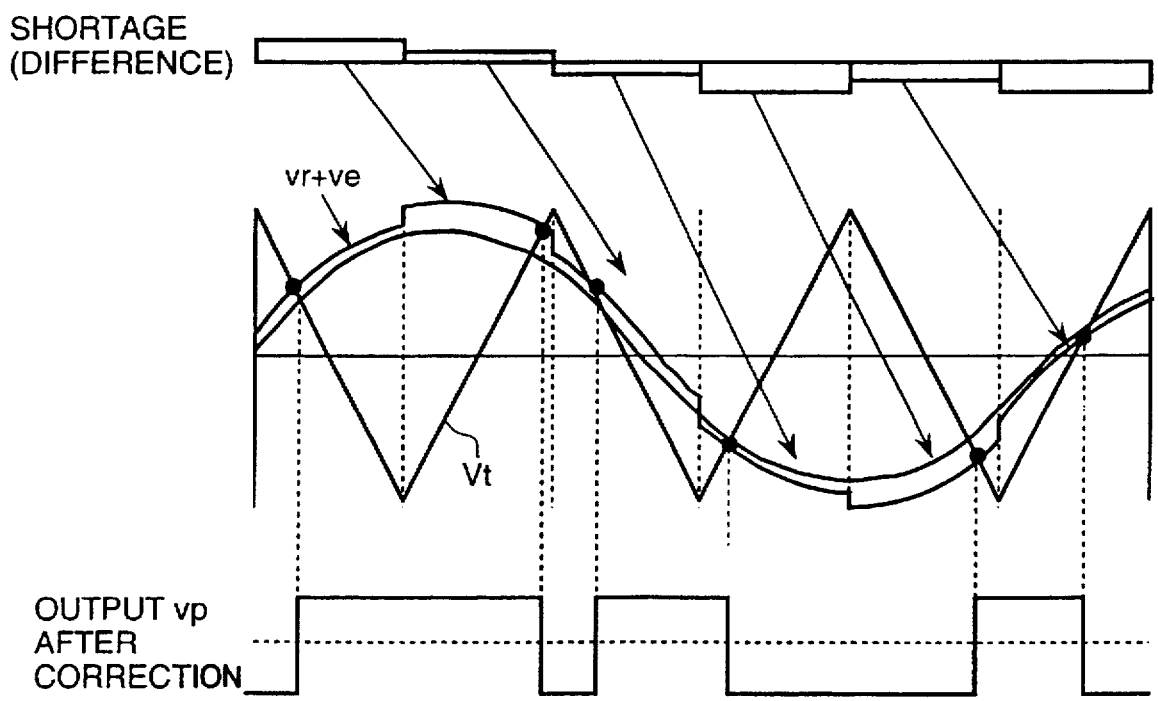
FIG. 3 is a waveform chart for explaining an operation of the present invention.

Therefore, as shown in FIG. 3, a command value in the next pulse calculation period, following a pulse calculation period where a difference $v_c$ is generated, is set to $v_r+v_c$. As a result, a pulse reflected value $v_c$ is generated in the output $v_p$ of the pulse calculation unit 2. Therefore, the difference $v_c$ in the voltage is certainly output in the next calculation period following the calculation period where the difference $v_c$ is generated. In a case where a pulse to be generated cannot be obtained because the pulse to be generated based on $v_r+v_c$ is larger than the maximum generatable pulse or smaller than the minimum generatable pulse, a shortage in compensation is reflected on the next following pulse. Therefore, even in such a case, $v_c$ can be properly compensated.

As described above, by repeating the calculation of an average value of the difference between a command value and an output pulse and by adding the average value of the difference to a command value $v_r$ in the next pulse calculation period, the average voltage of command values and the average value of the output pulses will agree and the difference between them becomes zero when they are counted over several pulse calculation periods. That is, it is possible to eliminate the component of lower order harmonics and the component of fractional harmonics which have a long period and which cause a low frequency pulsating current.

Thereby, the occurrence of low frequency pulsation can be suppressed. Further, the pulse width modulation pulse may be calculated by multiplying a gain to the average value $v_c$ according to the difference between the command value and the pulse width modulation pulse, and by adding the calculated result to the command value, if necessary. Furthermore, when the command signal is a periodic function, such as a sinusoidal wave function or a triangular wave function, an average voltage of the command values may be easily calculated by preparing a function integrating the command signal in advance and by obtaining an average voltage of the command value using the integrated function.

Figure 4:
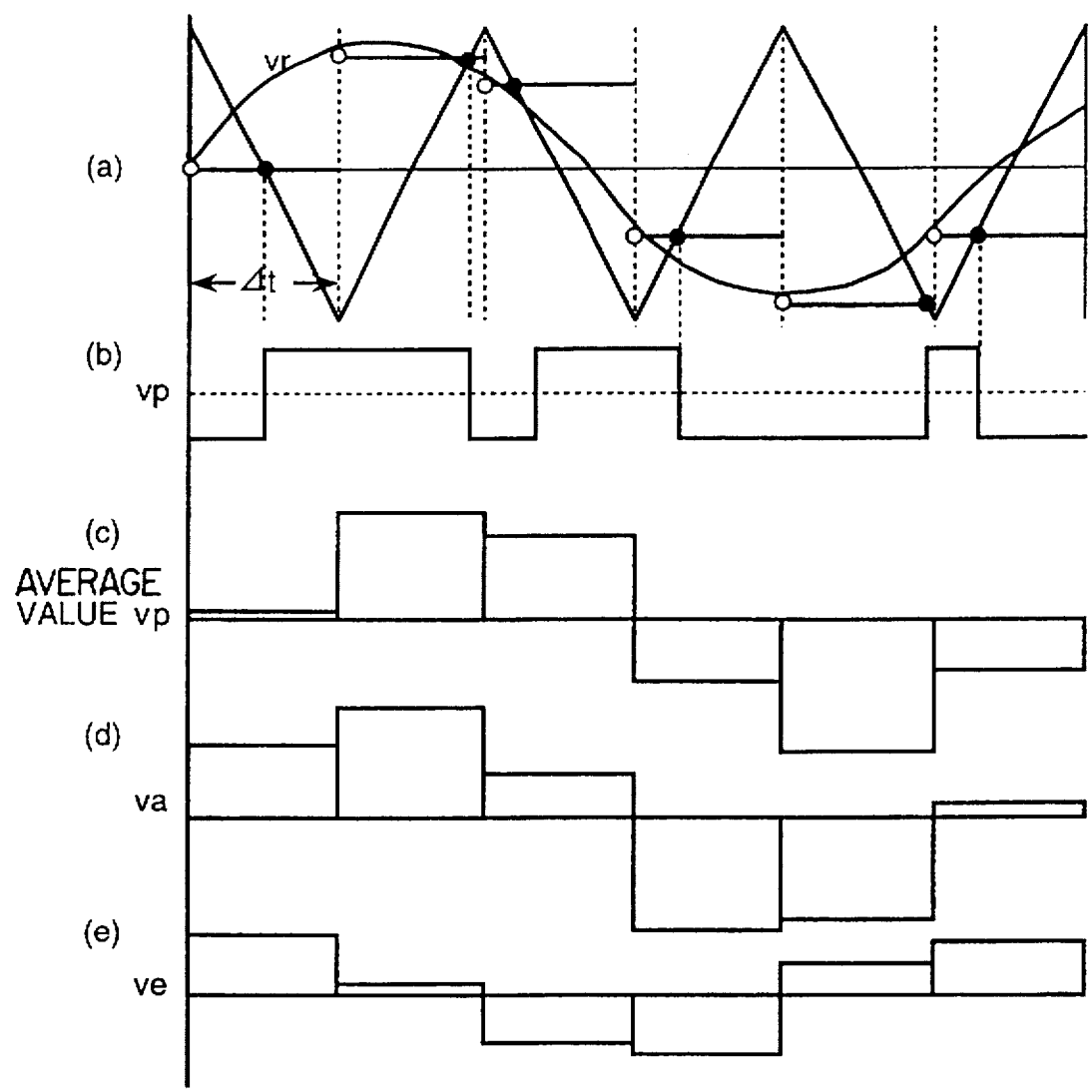
FIG. 4a–e is a waveform chart for explaining an operation when the present invention is applied to a discrete time system.

A description now will be presented concerning the operation of a system according to the embodiment of FIG. 1 using a discrete time system, such as software or a digital circuit. The signals and lines of FIG. 4 corresponding to those of FIG. 2 are indicated by the same reference characters. In the case of a discrete time system, it is impossible to continuously monitor the command value, and when a pulse width modulation pulse $v_p$ is calculated with software, the pulse width modulation pulse is not calculated by directly comparing the command value and the triangular wave as shown in FIG. 2. Although both the command value $v_r$ and the triangular wave are drawn together in FIG. 4, the triangular wave is a hypothetical wave and a command value is sampled at a timing $\Delta t$ corresponding to a one-half period of the triangular wave (hollow circles in the figure indicate sampling points). A pulse width modulation pulse $v_p$ is calculated based on the magnitude of the sampled value.

In this method, when the number of samplings becomes small compared to the frequency of the command value (when the frequency of the command value becomes large), the difference $v_c$ between the command value $v_r$, and the average value of $v_p$ becomes larger in comparison to the case of a continuous time system. Therefore, in the discrete time system, larger lower order harmonics and larger fractional order harmonics are produced and the pulsation in the current also becomes larger. When the command value $v_r$ is a periodic function, such as a sinusoidal wave function, the average value of the command value $v_r$ can be easily and accurately obtained by preparing an integrated function of the command value in advance, as described above, even in the discrete time system. By subtracting an average of $v_p$ from an average of a command value $v_r$, the difference $v_c$ can be calculated and the pulse can be compensated in the same manner as in the continuous time system. Thereby, the occurrence of lower order harmonics and fractional order harmonics can be prevented. As described above, pulsation in the discrete time system is larger than pulsation in the continuous time system. Therefore, the effect of the present invention appears more clearly in the discrete time system.

Figure 5A:
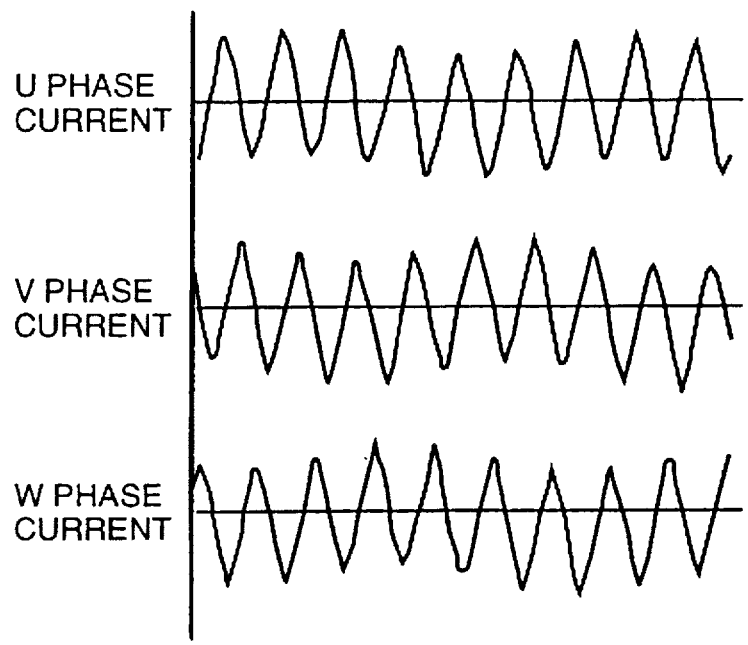
FIGS. 5A and 5B are waveform charts showing examples of simulation results in the case where an induction motor is driven by pulse width modulation according to the prior art and the pulse width modulation according to the present invention, respectively.
Figure 5B:
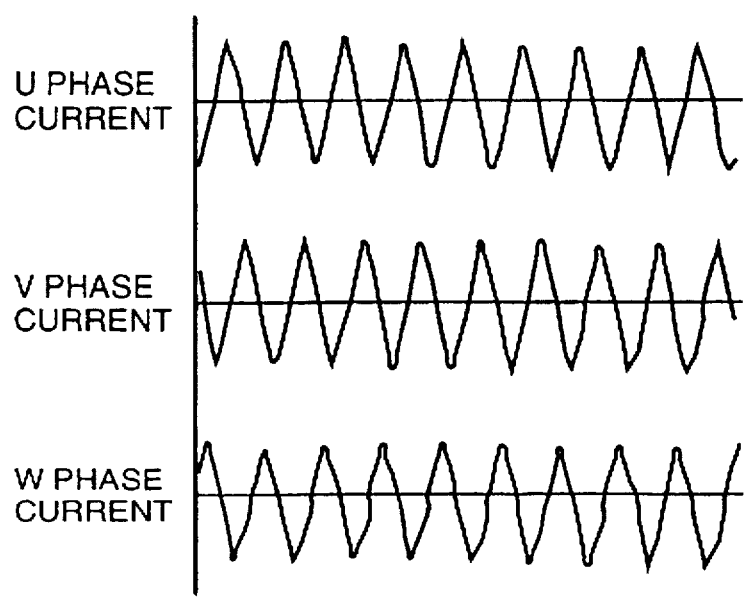

FIG. 5A and FIG. 5B show simulation results where an electric power converter, having an induction motor as the load, is driven by asynchronous pulse width modulation. FIG. 5A shows results where the inverter is controlled by the prior art and FIG. 5B shows results where the inverter is controlled by the pulse width modulation control according to the present invention. In order to clearly show the effect of the present invention in relation to the prior art, a case will be considered where the ratio n of the carrier frequency to the frequency of the command is 7.8 (smaller than 10). FIG. 5A shows a case without pulse compensation. Because there exists a difference between the average value of the command value over the pulse calculation period, a pulsation of low frequency (fractional order harmonics) occurs. On the other hand, in a case according to the present invention, there is no low frequency pulsation in the current, as shown in FIG. 5B, which shows the beneficial effect of the present invention.

For a discrete time system, the pulse compensation has been performed using the average value of the voltage difference in the same manner as for the continuous time system. In a case of the discrete system, particularly in a case of generating pulse width modulation pulses using software, most methods employ a construction where the time of changing a pulse from ON to OFF or from OFF to ON based on $v_r$ is calculated and then the state of the pulse is changed based on the calculated time. In this case, the same effect as in the case of performing pulse compensation using the average value of the voltage difference also can be obtained by determining the pulse generating time by adding time which is determined by converting $v_c$ to a pulse changing time which is determined from only $v_r$, and then by generating a pulse width modulation pulse using the pulse generating time.

Although the above embodiments have been described by taking an inverter as an example, it is needless to say that the present invention can be applied to a converter which converts alternating current to direct current.

According to the present invention, it is possible to provide an asynchronous pulse width modulation control system which can prevent generation of lower order harmonics and fractional order harmonics even at a low carrier frequency.

Further, by employing the present invention, the switching frequency of an electric power converter can be lowered. Therefore, the efficiency of the electric power converter can be improved and at the same time the system can be made small in size and light in weight.

What is claimed is:

1. A pulse width modulation control system for an electric power converter in which pulse width modulation pulses for driving semiconductor elements in an electric converter are calculated by comparing a command signal received from a command value generating means with a carrier signal having a continuous triangular-wave and a constant period, which system comprises:

means for separately calculating a time product of a command value of said command signal received from said command value generating means and a time product of said pulse width modulation pulses and for calculating a difference value representing a difference between both time products, said pulse width modulation pulse being calculated using said difference value to compensate said command signal received from said command value generating means.

2. A pulse width modulation control system according to claim 1, wherein said pulse width modulation pulse is calculated by setting a calculation period for calculating said pulse width modulation pulse to a one-half period of said triangular-wave carrier signal, by calculating a difference between an average value of said command values and an average value of said pulse width modulation pulses for every calculation period, and by adding said difference to said command value for the next pulse calculation period.

3. A pulse width modulation control system for an electric power converter in which pulse width modulation pulses for driving semiconductor elements in an electric converter are calculated by capturing a command signal received from a command value generating means every predetermined time period and calculating a pulse width modulation pulse having a width corresponding to a magnitude of said command signal, which system comprises:

means for separately calculating a time product of a command value of said command signal received from said command value generating means and a time product of said pulse width modulation pulses and for calculating a difference value representing a difference between both time products, said pulse width modulation pulse being calculated using said difference value to compensate said command signal received from said command value generating means.

4. A pulse width modulation control system according to claim 2, wherein said pulse width modulation pulse is calculated by calculating a difference between an average value of said command values and an average value of said pulse width modulation pulses for every calculation period for calculating said pulse width modulation pulse, and by adding said difference to said command value for the next pulse calculation period.

5. A pulse width modulation control system according to any one of claim 3 and claim 4, wherein, when said command value is a periodic function, an average value of said command values is calculated using a function obtained in advance by integrating said periodic function.

6. A pulse width modulation control system according to any one of claim 1 to claim 4, wherein said pulse width modulation pulse is calculated by multiplying a gain to the difference between said average value of the command values and said average value of the pulse width modulation pulses, and adding the calculated result to said command value.

7. A pulse width modulation control system according to claim 5, wherein said pulse width modulation pulse is calculated by multiplying a gain to the difference between said average value of the command values and said average value of the pulse width modulation pulses, and adding the calculated result to said command value.

* * * * *